United States Patent
Todd et al.

(10) Patent No.: US 11,741,211 B2
(45) Date of Patent: Aug. 29, 2023

(54) HUMAN TRUST API IN A DATA CONFIDENCE FABRIC

(71) Applicant: EMC IP Holding Company LLC, Hopkinton, MA (US)

(72) Inventors: Stephen James Todd, Center Conway, NH (US); Jason A. Shepherd, Austin, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 142 days.

(21) Appl. No.: 16/663,965

(22) Filed: Oct. 25, 2019

(65) Prior Publication Data

US 2021/0124817 A1 Apr. 29, 2021

(51) Int. Cl.
*H04L 29/06* (2006.01)
*G06F 21/44* (2013.01)

(52) U.S. Cl.
CPC .................................. *G06F 21/44* (2013.01)

(58) Field of Classification Search
CPC ....... G06F 21/316; G06F 16/337; G06F 21/44
See application file for complete search history.

(56) References Cited

U.S. PATENT DOCUMENTS

| | | | | |
|---|---|---|---|---|
| 9,015,832 B1* | 4/2015 | Lachwani | ............. | G06F 21/577 726/22 |
| 2013/0232562 A1* | 9/2013 | Rodriguez | ............ | G06F 21/316 726/5 |
| 2014/0157422 A1* | 6/2014 | Livshits | ............... | G06F 21/6245 726/26 |
| 2014/0359722 A1* | 12/2014 | Schultz | ............... | H04L 63/0861 726/5 |
| 2018/0069867 A1* | 3/2018 | Grajek | ................ | H04W 12/068 |

OTHER PUBLICATIONS

"MIT Technology Review: Machine-Vision Algorithm Learns to Judge People by Their Faces", Nov. 1, 2016, Emerging Technology from the arXiv, pp. 1-7, accessed on Oct. 4, 2019 via https://www.technologyreview.com/s/602762/machine-vision-algorithm-learns-to-judge-people-by-their-faces/.

Todd, "Information Playground: Edge Data and Trust Insertion", Sep. 18, 2019, pp. 1-3, accessed on Oct. 4, 2019 via https://stevetodd.typepad.com/my_weblog/2019/09/edge-data-and-trust-insertion.html.

Todd, "Information Playground: Enterprise Trust Insertion and IoT", Aug. 5, 2019, pp. 1-2, accessed on Oct. 4, 2019 via https://stevetodd.typepad.com/my_weblog/2019/08/enterprise-trust-insertion-and-iot.html.

* cited by examiner

*Primary Examiner* — Jason K Gee
(74) *Attorney, Agent, or Firm* — Workman Nydegger

(57) ABSTRACT

One example method includes receiving authorization from a human user to collect data concerning an interaction of the human user with a computing element, interacting with the human user, collecting data concerning the interaction, analyzing the collected data, generating trust and confidence information, concerning the human user, based on analysis of the collected data, and storing the trust and confidence information.

18 Claims, 9 Drawing Sheets

HUMAN TRUST API IN A DATA CONFIDENCE FABRIC

FIELD OF THE INVENTION

Embodiments of the present invention generally relate to data confidence fabrics or, more generally speaking, trust fabrics. More particularly, at least some embodiments of the invention relate to systems, hardware, software, computer-readable media, and methods for using human interaction with computing elements as a basis to generate, and share, a trustworthiness score for a human user.

BACKGROUND

Systems and methods have been devised to evaluate the trustworthiness of data, that is for example, whether or not the data is reliable. Such systems and methods may also determine a confidence level in the data. The confidence level may be a function of the reliability/trustworthiness of the data. Thus, data determined to be relatively reliable may be assigned a relatively high confidence level, while data determined to be unreliable may be assigned a relatively low confidence level. Depending upon various considerations concerning the source of the data, determining whether or not the data is reliable can be difficult, or even impossible in some cases. Correspondingly, assignment of a confidence level to that data can likewise be difficult, or impossible.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
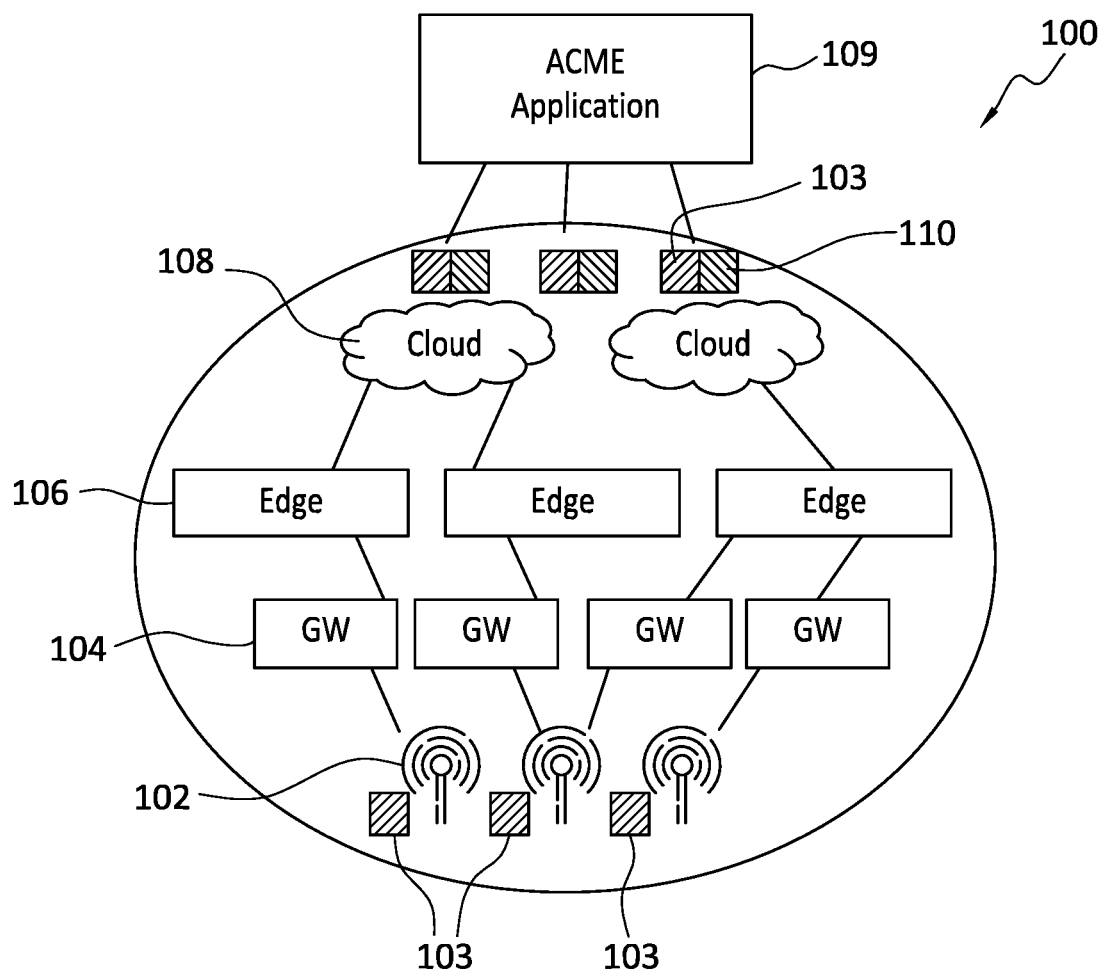
FIG. 1 discloses aspects of a first example DCF.

Embodiments of the present invention generally relate to data confidence fabrics. More particularly, at least some embodiments of the invention relate to systems, hardware, software, computer-readable media, and methods for using data concerning human interaction, including human behavior, with computing elements as a basis to generate, and share, a trustworthiness score for a human user. Thus, embodiments of the invention may be considered as including, or at least involving, a human trust application program interface (API).

In general, one or more example embodiments involve the use of data confidence fabric (DCF) technology and decentralized identities and artificial intelligence to allow an individual, that is, a human user, to grant access to devices, with which the human user interacts, such that the devices may gather information about the human user. That information may then be used for various purposes such as, for example, measuring or otherwise determining the trustworthiness of that user. The trustworthiness of the user, which may be expressed in the form of a trustworthiness score, may be shared outside of the user DCF, to the extent permitted by a user-specified policy.

Among other things, embodiments of the invention may enable a human user to create a "trust brand" that enables the user, for example, to enter more easily into online contracts and compensation for services, even if that user may not have had any prior business/trust relationship with the paying recipient of those services. The trust brand may be created by way of the DCF, which may integrate and analyze data from user-centric devices such as cameras, mobile devices and laptops that have GPS/Location-Based Services (LBS) and a combination of input/output capabilities in the form of audio, voice, video, AR/VR/MR, within the DCF, and the DCF may maintain control over all measurements and data created within itself.

As disclosed in more detail herein, implementation of at least some embodiments of the invention may involve the resolution of a variety of technical and other barriers and problems. Thus, embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a user may optionally share his trustworthiness to an ecosystem that may include other users, applications, computing entities, and other entities. An embodiment of the invention may enable a member of a DCF to evaluate a member of the same DCF, or another DCF, and then enter, or not, a relationship of some type with that member. An embodiment of the invention may enable a human user to give his consent to one or more devices to collect information concerning any one or more characteristics of that human user. An embodiment of the invention may collect and evaluate data streams generated by, at the direction of, and/or as a result of action(s) taken by, a human user in connection with the use, by the human user, of one or more devices. An embodiment of the invention may store some of the collected information. An embodiment of the invention may consolidate human user data collected by a variety of different devices. An embodiment of the invention may enable an application to challenge a trustworthiness score, and/or the measurements used to generate that trustworthiness score, and ask for proof for any measure and/or for the trustworthiness score. Various other possible advantages of one or more embodiments of the invention will be apparent from the present disclosure.

A. Aspects of Some Example Architectures and Operating Environments

The following is a discussion of aspects of some example operating environments for various embodiments of the invention. This discussion is not intended to limit the scope of the invention, or the applicability of the embodiments, in any way.

Devices in the operating environment may take the form of software, physical machines, virtual machines (VM), or computing elements, for example. As used herein, 'computing element' is intended to be broad in scope and embraces, among other things, any electronic device, software, and device that includes electronics of some type, with which a human user can interact, and any combination of the foregoing. Such computing elements may thus include, but are not limited to, audio and/or video media recorders and players, televisions, laptop computers, tablets, autonomous and semi-autonomous aircraft such as drones, mobile phones, medical devices, smart/fitness watches, sensors of any kind including sensors that monitor physical and other parameters of an environment such as temperature for example, smart voice assistants such as the Amazon Echo and Google Home devices for example, desktop computers, global positioning system (GPS)-enabled devices of any type, autonomous devices, vehicles, and machines of any type, AR devices, VR devices, mixed reality (MR) devices, and Internet of Things (IoT) devices. As well, computing elements may comprise, or consist of, software, and combinations of software and the devices or systems on which the software runs. Examples of software include, but are not limited to, software that comprises calendars. Calendar software may enable assessments as to the timeliness of a user in performing some particular action. As another example, collaboration software, such as Zoom, Slack, or Teams, for example, may enable assessments as to the ability and willingness of a user to work as part of a team, for example, determining whether the user shows up for meetings or not. Another example of software that may enable evaluation of the skills and characteristics of a user are word processing programs which may, for example, provide insights as to the grammar and writing skills of the user. As a further example, graphical editing software may provide insights as to the creative abilities of a user. Other examples of software that may be used to enable evaluation of the knowledge, characteristic, skill, and/or ability of a user include social media platforms such as Facebook and Instagram for example, customer relationship (CRM) platforms such as Salesforce, and Enterprise Resource Planning (ERP) software platforms. More generally, any software that may enable evaluation of any one or more of the knowledge, characteristics, skills, and/or abilities of a user may be employed in embodiments of the invention.

Interactions between a human user and a computing element may, among other things, cause, permit, and/or enable, the computing element and/or systems, software and devices other than the computing element, to take one or more actions. The interactions may be active such in the example of keystrokes entered by the human user for example, or passive such as in the example of a device operable to track the movements and responses of any portion of the human user. Interactions of a human user with a computing element may generate data, and/or cause the generation of data, by the human user and/or by the computing element.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, database, row, column, or object may be used by way of example, the principles of the disclosure are not limited to any particular form of representing and storing data or other information. Rather, such principles are equally applicable to any object capable of representing information.

With particular attention now to FIG. 1, one example of at least a portion of an operating environment for embodiments of the invention is denoted generally at 100. In general, the operating environment 100 may comprise, or consist of a Data Confidence Fabric (DCF). In general, data generated and/or collected by devices such as edge data devices may be forwarded from the edge data devices to one or more applications across a set of trusted nodes. When the data arrives at the application, the edge data may be processed by the applications with measurable confidence. In FIG. 1, a DCF implemented by the fictional ACME company is disclosed.

Note that as used herein, 'DCF' embraces any combination of one or more of computing elements, nodes, applications, end users, and confidence and trust data, information, and metadata, concerning one or more users. Thus, DCF is intended to be broad in scope.

In more detail, the example operating environment 100 may include various data generating devices 102. The data generating devices 102 may take various forms, such as sensors for example, which may or may not be IoT edge devices. As discussed below in connection with FIG. 2, a human user may be considered, in some circumstances at least, to be a data generating device. In general, the data generating devices 102 may generate raw data 103, such as by collecting information concerning the operation of computing elements, mechanical devices, and/or information concerning a physical environment, for example. Note that the data generating devices 102 are not limited to data generation but may additionally, or alternatively, collect data, and/or process data, as well as transmit data to one or more other entities.

For example, the ACME company of FIG. 1 may use data generating devices 102 in the form of one or more sensors to generate data from a manufacturing floor. As the raw data 103 flows through the DCF from the data generating devices 102, trust information may be inserted, and confidence, provenance, and policy, metadata may be added at every layer of the hierarchy, such as at gateways 104, edge devices and systems 106, and cloud storage sites 108. It is noted here that policy metadata embraces metadata defining, and/or reflecting, one or more policies that specify conditions concerning the sharing, or not, of user data such as, what data can be shared, with whom, and under what conditions. By the time an application 109, such as a corporate application for example, analyzes the raw data 103, trust insertion, confidence, provenance, and/or policy metadata 110 may have been associated with the original raw data 103 as the raw data 103 transited the DCF from the data generating devices 102 to the application 109.

When the approach outlined with respect to FIG. 1 involves machines or other non-human entities as the data generating devices 102, those devices may product trustworthy data as long as they are calibrated/accurate. This trustworthy data may, in turn, be shared and/or monetized and so the DCF of FIG. 1 may provide a benefit to an associated business entity, such as the ACME company, that collected the data. As noted herein, embodiments of the invention may additionally, or alternatively, involve one or more human users. That is, and similar to the data generating devices 102 of FIG. 1, a human user may be involved in the generation of data. Specifically, and with reference to concepts disclosed in connection with FIG. 1, the human user may interact with various systems and devices, and such interactions may result in the generation of data, which may be similar in some respects to the raw data 103. Where the data of interest is collectively generated by multiple users, that data may be used to draw conclusions and inferences concerning the users, considered as a group. For example, the data collectively gathered by a group of users may be analyzed to determine how well the members of the group or team collaborates, the overall tone of the collective engagement of those users, and/or other collective characteristics, knowledge, skills, and abilities of the group. More generally, embodiments of the invention may enable collection and evaluation of data collected in connection with composite relationships and arrangements that include any one or more of human users, locations, devices, software tools, general systems of record, and any other computing elements.

In contrast with the use of machines or other non-human entities however, the involvement of human users, such as in connection with a data generation process for example, may be somewhat more complex. As discussed below in connection with FIG. 2 however, which discloses an example DCF 200 that involves one or more human users, example embodiments may provide various functionalities that take account of, and effectively deal with, circumstances that may arise from, or be implicated by, human involvement.

B. Human Factors and Considerations in Operating Environments

Figure 2:
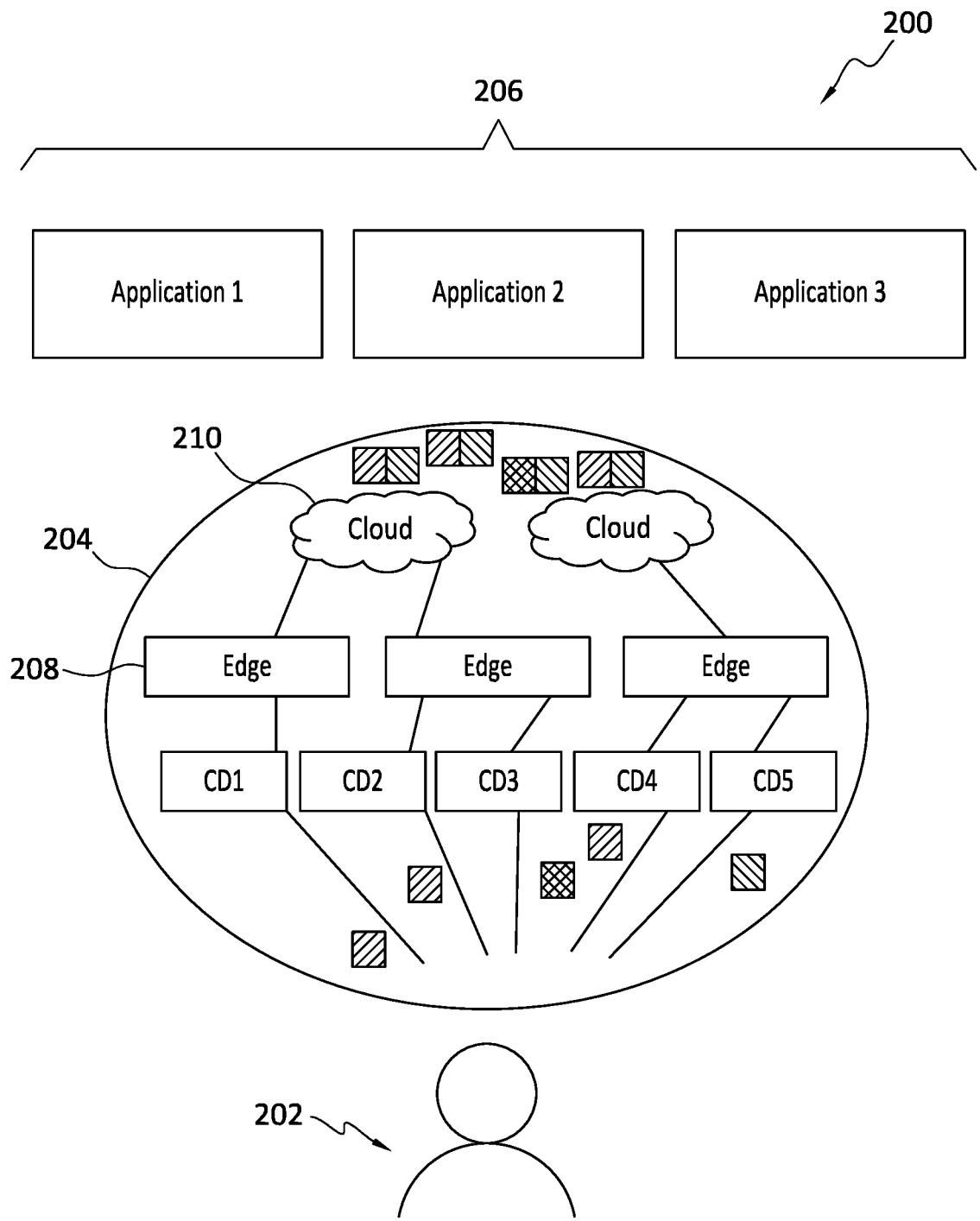
FIG. 2 discloses aspects of a second example DCF.

In general, the arrangement in FIG. 2 may involve, among other things, human permission granted to enable a trust measurement process, DCF gathering of human input and addition, by the DCF of confidence information to the data, and use, by an application for example, of human confidence information. More particularly, FIG. 2 discloses a DCF 200 in which one or more humans, such as a human 202, allow the DCF 200 to capture information about them, that is, the human users, based on policies set by the human 202, and one or more of the DCF 200 elements 204 then add trust metrics for potential consumption by various applications 206, also based on policies. The applications 206 in the DCF 200 may then process human 202 behavioral input to enable, for example, monetization of data generated in connection with the human 202 activity and interactions with one or more computing elements and/or other systems and devices. Monetization embraces, but is not limited to, the ability of the human 202 to be compensated for services, to be hired, or to be given permission to use a resource, for example. In the more general case, which embraces, but is not limited to, the example of monetization, the 'use' of data generated in connection with the human 202 activity and interactions with one or more computing elements and/or other systems and devices may embrace any arrangement, or potential arrangement, in which, as a result of the data generated in connection with the interactions of the human user 202, the human user 202, has access to an opportunity which may be beneficial in some way to the human user 202 and/or to one or more other human users. Thus, the sharing of data, and the monetization of data, are two example uses of data that was generated in connection with one or more interactions with one or more computing elements. Different uses of data may, or may not, be mutually exclusive, or the different uses of the data may be complementary in some way. Finally, it is noted that the concepts disclosed in connection with the example DCF of FIG. 1 may be incorporated into the example DCF 200, and vice versa.

As shown in the example of FIG. 2, the DCF 200 may include various devices which may be personally owned and attached to a trusted surrounding third party infrastructure. In more detail, an example group of devices may comprise a camera CD-1 in a city that may capture video of the human user, a personal home assistant CD-2 such as an Amazon Echo device that may capture, and act upon, audio commands from the human user, a personal laptop CD-3 that may capture keystrokes entered by the human user, an augmented reality (AR)/virtual reality (VR) device CD-4 that may watch and/or record the skills/reactions and/or other actions of the human user as he performs a guided task, and a mobile wireless communication device CD-5 may that may have location-based services enabled. More generally, any device that is able to capture, by any mechanism, data, in any form, concerning the actions of a human user may be employed in various embodiments of the invention.

As data flows through the primary DCF 200 from the human user and into other interconnected DCFs (not shown in FIG. 2), that data may make its way through a set of nodes that includes one or more edge devices and systems 208, and cloud storage sites 210, to the set of applications 206, human users, computing entities, and/or other entities, that may wish to enter into business with that individual human user. These entities, whether human and/or otherwise, may be interested in understanding the trustworthiness not only of the skills of the human user, but the trustworthiness of various other characteristics of that human user such as, but not limited to, his or her collaboration ability, punctuality, ethics, and morality. If the determined trustworthiness of the human user with respect to one or more characteristics of that human user is deemed by the entity as being at an acceptable level, then the entity and human user may enter into a relationship of some type, such as a business or commercial relationship, technical relationship, social relationship, and/or other type of relationship. In the example context of social media, the credibility and/or other traits of an 'influencer' may be evaluated by collecting and analyzing data concerning posts and other content provided by that influencer. This functionality may be particularly useful where the influencer is offering goods or services for sale.

As noted earlier, example embodiments may provide various functionalities that take account of, and effectively deal with, circumstances that may arise from, or be implicated by, human involvement. Following is a brief discussion of some aspects of embodiments of the invention that may be advantageous.

For example, embodiments of the invention may provide for a standard protocol or method by which an individual can grant permission to a device to capture behavioral or human data about themselves, and/or on behalf of another individual, process the data, and make "trust evaluations" about that person's various characteristics. As another example, embodiments of the invention may provide for standard algorithms and classifications that enable a device to process an input stream from a human and turn that stream into a confidence score that measures an attribute of human trustworthiness. Embodiments of the invention may enable a human user to provide permission for the user of his collected data based on any specific context. For example, the permission may specify that data could only be captured during working hours, within a specific location, when the user is alone, and/or on any other basis specified by the user.

Further, embodiments of the invention may provide standard classifications that can be used to tag confidence scores for any number of types of human trust measurements such as, but not limited to, talent, skill, punctuality, honesty, morality, trustworthiness, and dependability. Embodiments of the invention may provide for retained ownership of evaluation/classification metadata. For example, in connection with generation, by the DCF, of trust measurements based on human input, embodiments of the invention may enable an individual human user to set ongoing polices and maintain ownership of the measurements made involving user activity and which may serve as a basis for trust scoring, and classification, for example. Such embodiments may also help to ensure that the measurements are not made publicly available by the DCF without permission from, or on behalf of, the human user in connection with whom the measurements were made.

Embodiments of the invention may provide algorithms for overall "trustworthiness." Particularly, such embodiments may provide scoring mechanisms to calculate the overall trustworthiness of an individual human user across all potential classifications. This may include the trustworthiness of that individual across various "circles of trust" which may be, for example: completely internal to a particular organization, such as the employer of the individual; across a set of organizations doing business together; within an organization such as a university; and/or, within a larger entity such as a city that may cross, for example, public boundaries, private boundaries, global boundaries, and/or social or other circles, for example.

Embodiments of the invention may enable the sharing of human confidence scores with one or more applications. For example, embodiments may provide methods for a DCF, or a "quilt" of interconnected DCFs, to inform an application about the human trust measurements, on a sum total level, such as the overall trustworthiness for example, and/or on individual classifications, such as honesty, knowledge, or skill, for example, based on one or more policies set by that individual or an authorized representative of that individual.

Finally, embodiments of the invention may provide for proofs and trustworthiness challenges concerning measurements and/or confidence scores associated with a particular human user. For example, an application may wish to have further proof about how the confidence scores were calculated, that is, the application may want to confirm that the individual did not simply assign good confidence scores to himself. Thus, embodiments of the invention may provide a system and method enabling an application, for example, to challenge any one score by contacting the DCF entity that generated the additional trust metadata.

C. Example Embodiment of DCF and Method For Granting Access

Figure 3:
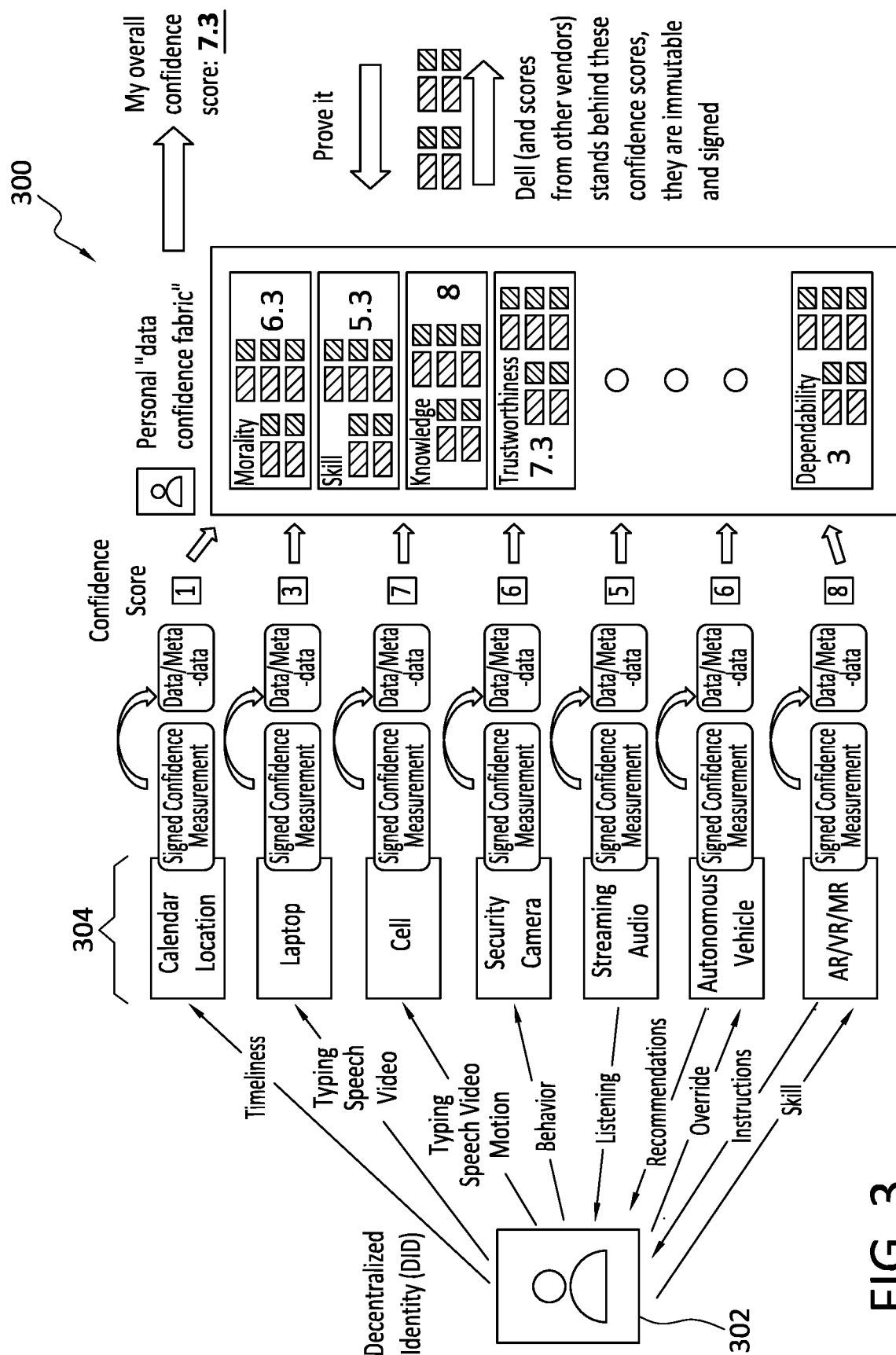
FIG. 3 discloses aspects of an example DCF and relation to a human user.

Turning next to FIG. 3, details are provided concerning aspects of an example embodiment of the invention. In general, and as discussed in more detail below, embodiments such as the example disclosed in FIG. 3 may combine DCF technology with techniques using decentralized identities and artificial intelligence to allow an individual to grant access to computing elements, such as Dell Inc. client devices for example, which may include PCs, laptops and tablets, and other devices such as AR/VR accessories, smart voice assistants, as well as the other examples of computing elements disclosed herein. By granting such access to one or more devices with which he may interact, a human user may enable such devices to, among other things, measure his trustworthiness, as well as selectively share his trustworthiness scores outside of the DCF based on the policy-based permission of the human user.

As shown in FIG. 3, a system architecture 300 is disclosed that may involve one or more human users, each of whom may have a unique respective decentralized identity (DID) 302. The user may interact with any one or more of a group of computing elements 304. For example, a user may interact with multiple devices, such as a calendar and a GPS enabled device for example, and data gathered by the two devices may be considered collectively to provide insights concerning the user, such as, in this case, that user is late to a meeting. That is, the GPS enabled device may be able to determine the location of the user at a particular time, and the calendar may indicate that the user is scheduled, at the particular time, to be in a location that is different from what is indicated by the GPS enabled device. Thus, when the two data streams are considered collectively, it may be concluded that the user is late for a scheduled meeting. Further, a user interaction may take various forms, and the user may interact with one or more of the computing elements in more than one way.

In some instances, the interaction may be two way, that is, the computing element may communicate to the user, and the user may communicate to the computing element. In other instances, the interaction may be one way, that is, the user may communicate to the computing element but the computing element may not communicate back to the user, or the computing element may communicate to the user but the user may not communicate back to the computing element. Thus an interaction may not necessarily require an action on the part of each of the user and the computing element. Any number of interactions may take place between a user and a computing element.

An interaction may be active and/or passive in nature. A keystroke on a computing element made by a user is an example of an active interaction because the user has to take an affirmative action, that is, the user has to depress, or otherwise select, the key. On the other hand, a user listening to an audio stream transmitted by a computing element is an example of a passive interaction because it requires no affirmative action on the part of the user.

In some embodiments, the user may be provided the option to review and approve data collection, and/or data usage after collection, for each interaction of the user with a computing element or group of computing elements. For example, the user may have the opportunity to review, on an individual or subset basis, each of several groups of word processing data. This review, and approval or not, may be a prerequisite for entry of the collected data into a DCF. That is, if the user approves a first group of collected, or to be collected, word processing data, but not a second group of word processing data, the first group may be entered in the DCF, but the second group may not be entered in the DCF. The user may provide approval for entry of data into the DCF before the data is collected, on-the-fly as the data is collected, and/or after the data has been collected. In at least some embodiments, the preferences of the user concerning entry of data in the DCF may be captured in the form of one or more user-defined policies, examples of which are disclosed elsewhere herein.

An interaction may involve any one or more of the five senses of a user, and/or comparable capabilities of a computing element. Thus, some example interactions, such as listening, may involve only a single sense. Other example interactions, such as a key stroke, may involve multiple senses, such as the sight and sense of touch of the user. Still another example interaction may involve sensing and recording, with a computing element comprising a camera, one or more visual aspects of a user, such as a reaction or response of the user to video content transmitted by the computing element or another computing element. In this last example, the comparable 'sense' of the camera is its ability to visually detect and record actions by the user, as well as basic information such as the presence of a particular user, in a particular place, at a particular time.

Finally, and as suggested by the foregoing examples, an interaction may have only one, or multiple, components. That is, an interaction may include a human-performed component, and/or a machine-performed component. The human-performed component and/or the machine-performed component may be active or passive in nature, and a particular interaction may have both passive and active components.

In general, any interaction may have any combination of any of the interaction attributes, properties, or characteristics, disclosed herein. As such, the foregoing are presented only by way of example, and are not intended to limit the scope of the invention.

With continued reference now to FIG. 3, it can be seen that various interactions may occur between the user and one or more of the devices in the group of computing elements 304. For example, a user may demonstrate his timeliness by maintaining a calendar on a computing element, and marking items when they are completed, and/or calendar data may be considered or combined with data from another computing element to determine, for example, that a user is late to an appointment or showed up on time for an appointment. As another example, a user may interact with a laptop by the use of keystrokes, speech, and/or enabling the laptop to record video of the user. User interaction with a cell phone may similarly involve typing, speech, video, and motion of the user, where the motion may be tracked by way of a GPS-enabled cell phone. In another example, a security camera may record audio and/or video of a user and thus obtain information concerning the behavior of that user. Further still, a streaming audio device may provide audio content to which the user may listen. In another example, the user may speak to a device that may be capable of recording, analyzing, and/or understanding the words spoken by the user. As a further example, a user may interact with an autonomous vehicle such as a car, by receiving a recommendation from the autonomous vehicle as to a particular route to take and/or by overriding the recommendation with another route which may be entered by a keypad, or spoken, for example. In a final example, a user may receive instructions and/or audio/video input from an AR/VR/MR device, and then respond accordingly. In this way, the user may demonstrate a particular skill level to the AR/VR/MR device. As noted herein, the capture of data concerning any interaction may be based on one or more policies, and/or a specific context of the data.

In each of the foregoing examples, the DID 302 identity may grant "evaluation" permission to a device that is part of a "personal" DCF, that is, a DCF that comprises or consists of computing elements with which that particular user interacts. Such permission may be granted using decentralized identity techniques. The user may, or may not, own and/or control one or more of the computing elements in his personal DCF. Moreover, characteristics such as the scope of the personal DCF may change as computing elements are added or removed. In some cases, a computing element may be 'removed' from the personal DCF simply by being disabled, by the user, from collection of user data. As well, the personal DCF of one user may overlap with the personal DCF of another user, at least in terms of the computing elements employed by the user. For example, two people in the same household may both use the same laptop computer, while there may be other computing elements that are used by only one, or the other, of the two people. In this example circumstance, each person may separately authorize, or not, that shared laptop computer for data collection specific to that person and/or on behalf of another person. To briefly illustrate, a parent may authorize tracking of her children on their social media accounts so that she can take steps to protect and preserve the character and reputation of her children.

Also, and with regard to identity schemes such as DID, it will be appreciated that other approaches may be employed. For example, centralized permissions, such as Lightweight Directory Access Protocol (LDAP) and Active Directory may be employed in some circumstances, such as in cases where multiple different users are able to communicate with a central authority. Another example approach to identity schemes and authentication that may be employed in embodiments of the invention employs distributed ledgers, or blockchains to handle user ID registration and ongoing identity and authentication. The Decentralized Identity Foundation (DIF) (https://identity.foundation/) is pursuing developments in this field.

In the example of FIG. 3, each computing element that has received permission from the user or on behalf of that user can then begin to measure the trustworthiness of the individual, based on user interactions with the computing element, by receiving different types of data streams, such as video, audio, typing, location, for example, from the individual. Users may grant access to these streams based on policy, both absolute and by context. For example, one permission policy may take the form " . . . only [1] monitor my typing [2] while Iam at work [3] between the hours of 8 AM to 5 PM [4]." In this example, four different constraints are identified or specified by the user, although more or fewer constraints may be employed in other policies. As this example illustrates, various elements may make up or define a particular context in which data may be authorized for collection, collected, and evaluated. In this example, the context for the data collection embraces elements such as the interaction type, the computer element employed for the interaction, the human user and related persons, and a timeframe for data collection. Thus, the context for one or more particular data collection and analysis operations may be defined in whole, or in part, by a user-generated policy, although that is not necessarily required. Policy templates may be employed, so that the user need not build a new policy each time one is needed. The computing elements 304 then analyze the various user-approved data streams to generate a confidence score that maps to one or more human classifications. The captured data stream, along with any other confidence score or metadata, may then be protected and secured against any access from outside of the DCF. Access may initially be granted only to the measured user for review and to set policy for sharing user data with other entities.

As used herein, a confidence score, which may be defined for an individual user and/or for a group of users such as a team for example, may be expressed as a numerical value, such as 7 out of 10 for example, that quantifies an extent to which an application or other end user has confidence in a particular data source and/or the data generated by or in connection with that data source. A team or group confidence score may be based, for example, on respective individual confidence scores generated for one or more members of the team or group. The numerical value of the confidence score may be based upon how many 'trust insertion' technologies have been applied to data originating from that data source. Various trust insertion technologies may be applied to a flow of data as the data passes from a source to a destination, such as an application for example. As disclosed herein, the flow of data may be generated as a user interacts with a computing element, for example, and the data may pass through various nodes and environments, such as one or more DCFs for example, before arriving at an application or other entity that may use the data in some way and/or may wish to interact in some way with the user who generated the data stream. The result of the application of the trust insertion technologies to the data flow is that the data flow from the particular data source thus acquires, and/or enables the calculation of, a trust measurement that is specific to that data. The various trust measurements, for each of a group of respective data streams generated by the user in connection with respective computing elements, may then be added, or otherwise combined or processed, to generate an overall confidence score for that particular user. Depending upon the interest and need of the application or other end user of the data stream and/or of the associated trust measurements and/or confidence score, it may not be necessary to include all trust measurements when generating a confidence score. That is, only specific trust measurements that are of particular interest may be used, and any other trust measurements omitted, when the confidence score is generated. Further examples of some trust insertion technologies are disclosed in Appendix A hereto, which is incorporated herein in its entirety by this reference.

In some embodiments, trust metadata may be added to, or otherwise associated with, the data of the datastream as it flows from the user into the DCF, for example. Such trust metadata, if/when employed, may help to justify or serve as a basis for a trust measurement and/or confidence score ultimately generated for the datastream. For example, if an application can see that the trust measurement for a piece of data is 6 out of 10, the application may also look at trust metadata associated with that data and see, for example, that attributes such as "digital signatures," "provenance information" and "immutable storage" were the trust insertion technologies applied to the data as it flowed from the user to and/or through the DCF. The application of each of these trust insertion technologies may each be assigned a point value, for example, such that the cumulative effect of the application of the trust insertion technologies may be assessed, in some embodiments, by adding the respective point values together to obtain a total value of trust metadata for the data stream. Other operations, such as multiplication or various statistical operations for example, may additionally or alternatively be employed to obtain or generate a total value of trust metadata for a data stream. The data/data source may be deemed trustworthy, or not, based on that total value of trust metadata. In some embodiments, the trust insertion technologies may each have the same respective weight, or different respective weights. The weights may be multiplied by the point values to obtain a final value for each trust insertion technology that was applied. For example, a digital signature trust insertion technology may be accorded a relatively greater weight than an immutable storage trust insertion technology. In any case, the application or other entity that receives trust measurements, confidence scores, and trust metadata may evaluate the trustworthiness of the data and/or data source by considering any one or more of those measures. In the illustrative example just noted, the trust measurement of 6 may not be satisfactory to the application, but if a value associated with the trust metadata is sufficiently high, the combination of the trust measurement information and the trust metadata information may be adequate to satisfy the requirements of the application.

With continued reference now to FIG. 3, the user may feed all confidence scores and metadata into a user-specific tracking structure, such as the personal data confidence fabric disclosed in FIG. 3, that maintains an overall trustworthiness score for that user based on the respective confidence scores associated with each of the data streams. This tracking structure may contain DCF provenance that describes, for example, the ingest environment, which computing element captured the data, which computing element analyzed the captured data, which computing element generated the confidence score, as well as other contextual information such as who the user was with during the interaction, where the user was physically located during the interaction, and what the user was doing beyond the interactions. In the example of FIG. 3, the calculated confidence score of the user is 7.3. As noted herein, the data and metadata contained in a user-specific DCF may be shared, with the permission of the user, based on various policies. In this regard, it is noted that, based on one or more policies set by an individual user, and/or by another on behalf of that user, the confidence score for the user may traverse any combination of DCFs, networks, and nodes, for example. Thus, a user-specific DCF may span a variety of different computing elements, environments, and users.

The individual may then advertise, or otherwise make known, his trustworthiness, expressed in the form of a confidence score, to the broader ecosystem of applications (not shown in FIG. 3). These applications may receive permission from the user to view the confidence scores and may also challenge the user and/or computing elements 304 to provide proof as to how the constituent confidence scores in the personal DCF of the user were calculated.

The advertisement by the user may be an advertisement of the overall trustworthiness of the user, and/or individual or sub-sets of various attributes of the user. Thus, the content of the advertisement might vary depending on what trust circles the individual is broadcasting to. For example, if the user is trying to monetize their professional knowledge, possibly by partnering with an engineering firm for example, the 'knowledge' and 'skill' scores of that user, shown in the personal data confidence fabric in FIG. 3, may be of particular interest to potential partners in a professional relationship. As well, the trustworthiness of a user may be influenced by, and reflect, various external factors. For example, a recipient of a service performed by the user may confirm that he had a good experience, and that information may further enhance the confidence score of the individual who provided the service.

Figure 4:
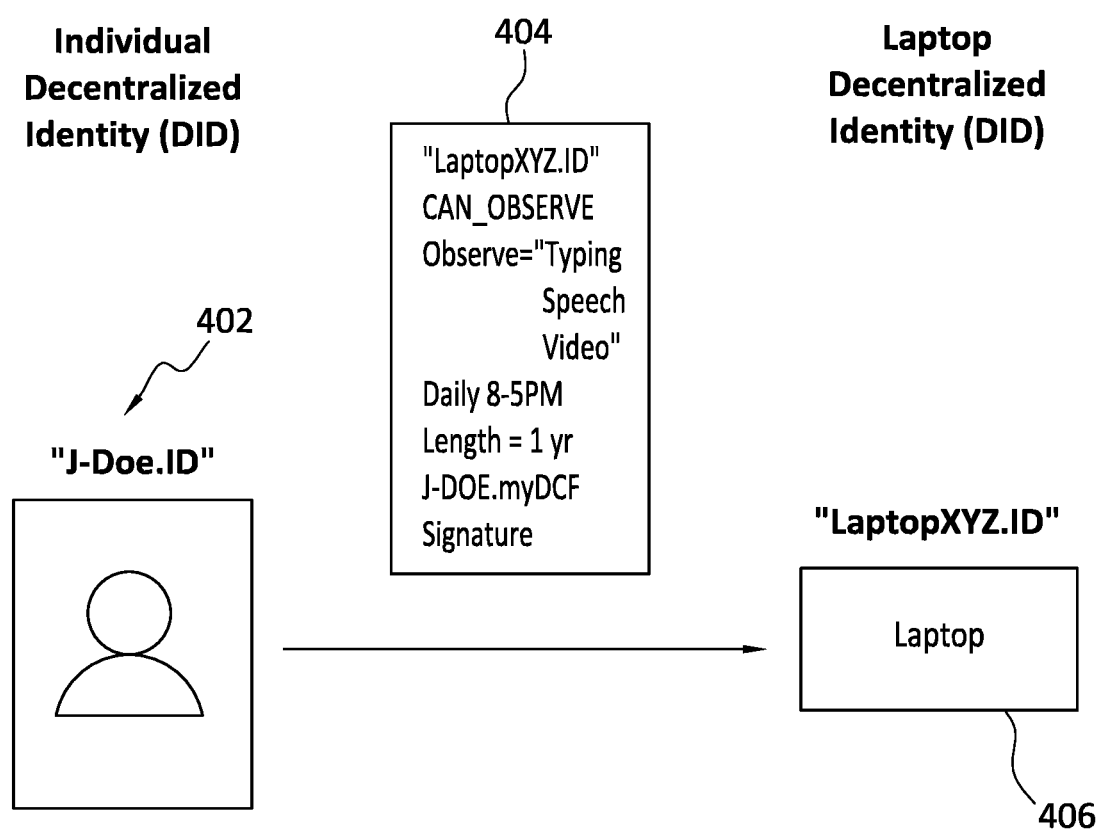
FIG. 4 discloses aspects of an example data collection authorization scheme.

With continued attention to FIG. 3, and directing attention now to FIG. 4 as well, further details are provided concerning some example embodiments of the invention. As noted earlier, a user may initially give consent to a computing element, with which the user interacts, and/or expects to, to ingest data about the user, and to use analytic algorithms, which may be hosted on the computing element or elsewhere, to measure trust during human-computing element interactions.

As shown in FIG. 4, a hypothetical user, J-Doe, has created a decentralized identity, and now possesses a private key that can prove that he is the person linked to the decentralized identity, or DID 402 which, in this case, takes the hypothetical form 'J-Doe.ID.' As indicated in FIG. 4, the computing element 406 may also have a DID, in this case, the DID of the computing element 406 may take the hypothetical form 'LaptopXYZ.ID.'

The user J-Doe may interact with both personal devices, such as a laptop for example, and devices tied to physical infrastructure around him. As well, J-Doe may send a signed, verifiable permission 404 that gives the computing element 406 permission to begin observing J-Doe through a variety of input streams, such as typing, speech, and video, for example, for a particular time period such as one year, and to store all trust measurement results in the personal DCF of that individual, which may be designated, for example, as 'J-Doe.myDCF.'

The permission 404 may also specify other parameters, such as a time length for the data gathering, and dynamic monitoring as well, such as a specification that data is only permitted to be collected during work hours, and/or only when the user is around certain people, for example. In general, any type and number of parameters may be specified in the permission 404, and the user may change the parameters of the permission 404, or withdraw the permission 404, at any time. In some embodiments, the permission 404 may be withdrawn, and then replaced with a new permission.

The permission 404 may be digitally signed by the user using a private key that is unique to J-Doe. Thus, the laptop may now retain the permission 404 and use it as proof of permission to collect the specified data, should such proof ever be required or requested. The computing element may receive the permission 404 and, if the computing element has a public key provided by the user, the computing element is able to verify that the permission 404 has been sent by J-Doe and may then being monitoring J-Doe, analyzing the behavior of J-Doe, and generating trust metadata, as described in more detail below. If the computing element has not been provided with the public key of J-Doe, then the computing element will not be able to verify where the permission 404 came from and may be blocked from monitoring the behavior of J-Doe. More generally, the computing element may be prevented from collecting data concerning any user without having in its possession the public key for that user. In some embodiments, the permission 404 may be encrypted before, or after, signing by J-Doe.

Figure 5:
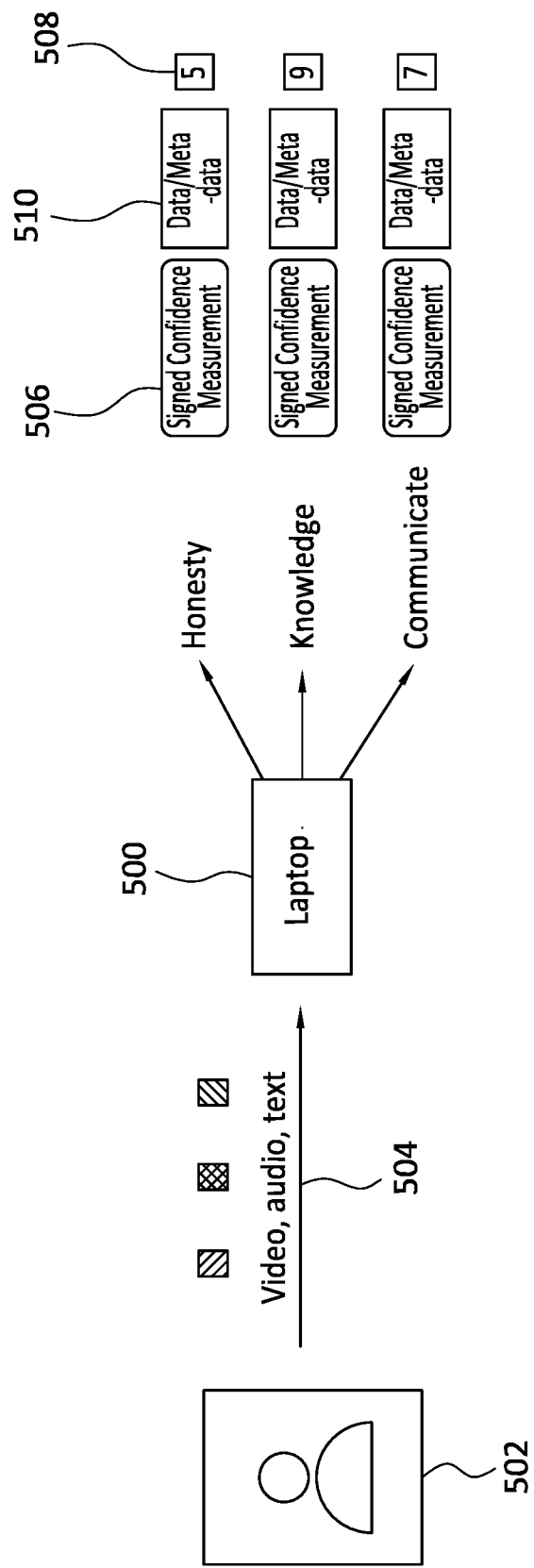
FIG. 5 discloses aspects of an example analytical scheme.

With continued reference to FIGS. 3 and 4, and turning now to FIG. 5 as well, further details are provided concerning the generation, by a computing element 500 authorized to collect user 502 data, of trust metadata. Particularly, with permission such as permission 404 (see FIG. 4) in hand, the computing element 500, which may be personally owned by the user 502 or by a trusted third party, may begin receiving and evaluating input data streams 504, such as video, audio and/or text for example, from the user 502. In some embodiments, user data that was collected in real-time and not edited may be deemed to more accurately reflect confidence than edited data.

In the example of FIG. 5, the computing element 500 may have a set of one or more analytic algorithms that are executable to evaluate an overall "honesty" appearance of the user 502 via video, the knowledge of the user 502 concerning certain topics based on how the user 502 speaks and what the user types, and the algorithms may evaluate the ability of the user 502 to communicate via audio, for example, how articulate the user 502 is. In short, the algorithms on the computing element 500 may, in the illustrative example of FIG. 5, assess the overall knowledge and oral and written communications of the user 502. Should the user 502 choose to advertise the outcome of the analyses performed by the computing element 500, that information may be leveraged by the user 502, such as through advertising and/or other communication mechanisms for example, to command a relatively higher compensation for his skillset in the open market.

With continued reference to FIG. 5, algorithms on the computing element 500 may generate confidence measurements 506, confidence scores 508, and other data/metadata 510 upon which the results are based. The confidence measurements 506 may be signed using a private key of the computing element 500, or using other identity-based methods, one example of which is the identity of the analytic software maker. The confidence measurements 506 and confidence scores 508 may be standardized to a common format and classification.

One example of an algorithm such as may be employed by a computing element 500, for example, is disclosed in *MIT Technology Review* (Nov. 1, 2016) (https://www.technologyreview.com/s/602762/machine-vision-algorithm-learns-to-judge-people-by-their-faces/). The immediately aforementioned article is attached hereto as Appendix B and is incorporated herein in its entirety by this reference.

In addition to the computing element 500 generating metadata concerning various attributes of the user 502, and referring briefly back to FIG. 3, there are many other computing elements, and methods, for generating trust, including many of the entities in FIG. 3 which were briefly discussed earlier. Such devices and methods may include, for example: a calendar, when combined with a GPS/location-based services (LBS) for example, may evaluate the dependability of a person by determining whether or not he shows up on time for appointments; a cell phone may perform many of the functions of a laptop, such as voice and audio for example, and may also add measurements such as activity, location, and/or motion; a trusted third party surveillance camera may observe the behavior of the user in a larger setting with more people, and a listening device may do the same for spoken audio; a connected car, which may or may not be autonomous or semi-autonomous, may observe how "obedient" a person is, or is not, to following suggested dashboard commands such as cruise control recommendations for example, and the car may perform feedback loops based on this approach; and, AR/MR/VR devices may, for example, follow a user as he works through instructions on how to fix or replace a part, and may evaluate the ability of that user to follow directions, timeliness, thoroughness, and effectiveness, for example.

Each of the attributes in the aforementioned example data streams may be measured, or not, per one or more policies set by the user. Such policies may reflect a judgement by the user as to whether he feels that it is worth sacrificing certain aspects of privacy in order to get measurable value, such as compensation or social status for example, in return. For example, measuring alertness, such as using a camera to evaluate eye gaze for example, may be important for truck drivers since they would want to be able to objectively demonstrate that they are able to maintain an adequate level of alertness while driving.

Thus, there may be some tension between, on the one hand, the interest of the user in preserving his privacy as much as possible and, on the other hand, the interest of the user in providing the type and quantum of data that is needed to support a reliable, and good, confidence score for that user. Thus, the policies implemented by the user may reflect the striking of a balance, by the user, between these potentially competing considerations.

With continued reference to FIG. 5, the assessing device, computing element 500 in this example, may then persist the collected data 504 into the DCF that was specified, or defined, by the user, that is, the personal DCF of the user. This may be accomplished in a variety of ways, such as by accessing secure shared storage, or using protected transport of the collected data 504 to a remote portal, for example. The data 504 may, or may not, be stored together with the results of analyses performed on that data 504.

Figure 6:
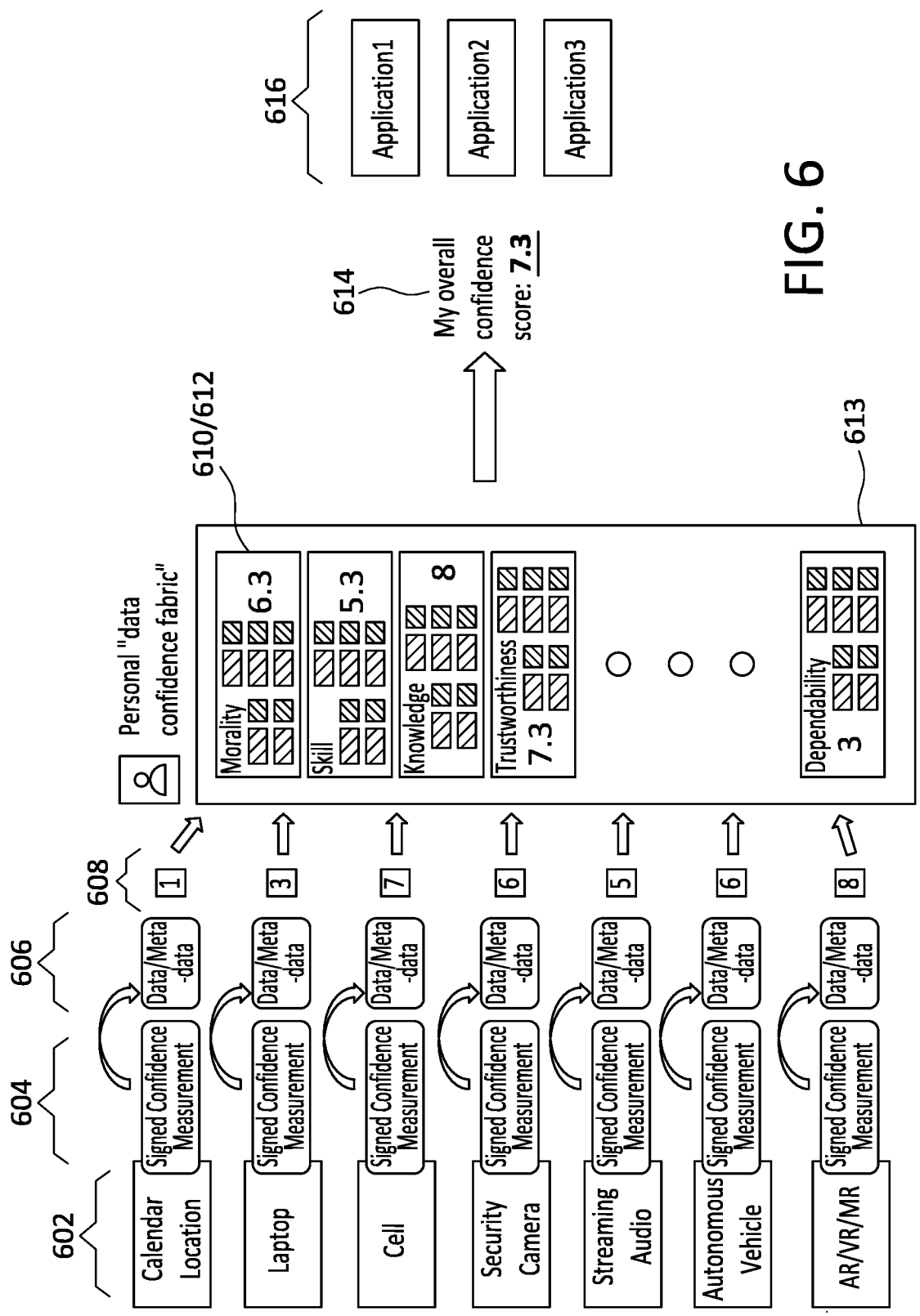
FIG. 6 discloses aspects of a DCF and scheme for generating an overall confidence score.

Turning now to FIG. 6, and with continued reference to FIGS. 3-5, further details are provided concerning consolidation of trust results that have been generated for a user. As noted in the discussion of the preceding Figures, the user has authorized the collection of data, by a variety of computing elements, concerning interactions of the user with those computing elements. The computing elements may be elements of a personal DCF of that user. Note that the collection of the data by the computing elements may also be referred to herein as a measurement process in which measurements have been taken, or generated, by the computing elements. In any case, not only does the user have full access to the data collected by the computing elements concerning the interactions of the user with those computing elements, but the user also has proof that the measurements were generated by the device because the measurements were signed using the private key of the computing element.

Next, should the user see a reason for doing so, he may begin to advertise either the discrete confidence scores for any given data stream, and/or the user may generate, or request the generation of, an overall confidence score by collecting the measurements across all categories and all devices. Details concerning one embodiment of this approach are disclosed in FIG. 6.

Particularly, in FIG. 6, an arrangement is disclosed in which various computing elements 602, authorized by the user to collect data regarding interactions of the user with those computing elements 602, may assign signed confidence measures 604 to the collected data, as well as append metadata 606 to the collected data. As disclosed elsewhere herein, including in connection with FIG. 5, each of the computing elements 602 may then generate a respective confidence score 608 for the data stream collected by that particular computing element 602.

The user, such as 'J-Doe.ID' for example, may have full control over his data, metadata, and scores. The user may, but is not required to, collate these scores to generate an overall confidence score and may now share these measurements to applications in any way he sees fit. For example, and as shown in FIG. 6, the individual confidence scores 608 may be combined together to define a respective confidence score 610 for each of a group of user attributes 612. In some embodiments, the confidence scores 610 may be obtained by assigning respective weights to one or more of the individual confidence scores 608. The weights may be assigned, for example, based upon the perceived relative importance of that particular individual confidence score 608. Thus, the confidence scores 610 will reflect, to some extent at least, those assigned weights. Further, the individual confidence scores 610 may be determined based upon any grouping of one or more of the individual confidence scores 608.

With continued reference to FIG. 6, the confidence scores 610 and corresponding user attributes 612 may comprise elements of a personal DCF 613 of the user whose data has been collected by the computing elements 602. As noted, the user may choose to share one or more individual 'confidence score:user attribute' pairs and/or an overall confidence score with any of a variety of entities 616. Such entities 616 may include, but are not limited to, applications in the operating environment. The entities 616 may additionally, or alternatively, include human users, and business and other enterprises, computing networks, network nodes, and 'circles of trust,' examples of which are disclosed herein.

Figure 7:
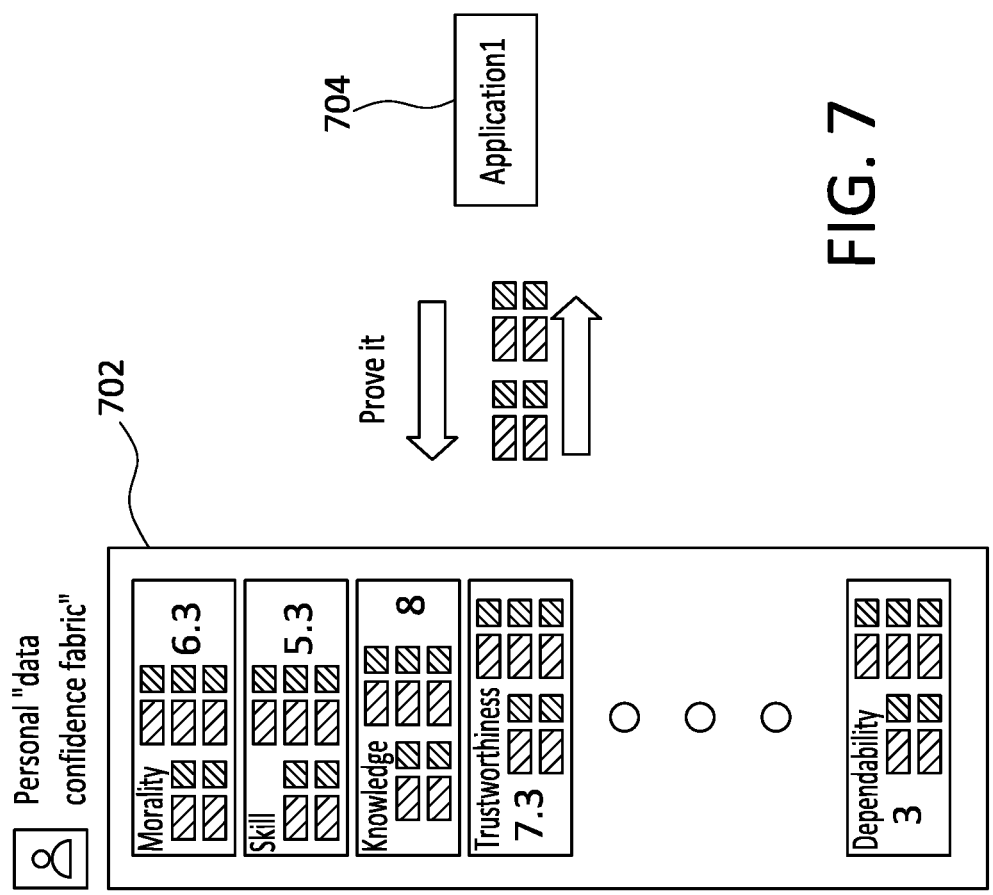
FIG. 7 discloses aspects of a challenge process.

Turning next to FIG. 7, and as disclosed elsewhere herein, embodiments of the invention may enable an entity, such as entity 616 of FIG. 6 for example, to challenge a confidence score received by that entity from a user, such as the user whose DID is 'J-Doe.ID.' In the example of FIG. 7, a personal DCF of the user communicates with one or more entities 704, such as 'Application1' for example. Particularly, in this example, the entity 704 is questioning individual trust measurements and/or overall trust measurement being advertised by a user. This user may share a subset of the data stored in their personal DCF 702, and this subset of data may contain signed statements by known authorities, such as Dell for laptops, that inform the entity 704 that a specific identity, such as 'J-Doe.ID' for example, stands behind the trust measurements being provided by the user 702 to the entity 704, and that the identity can prove, if further queried, the measurements that were taken.

D. Example Methods

Figure 8:
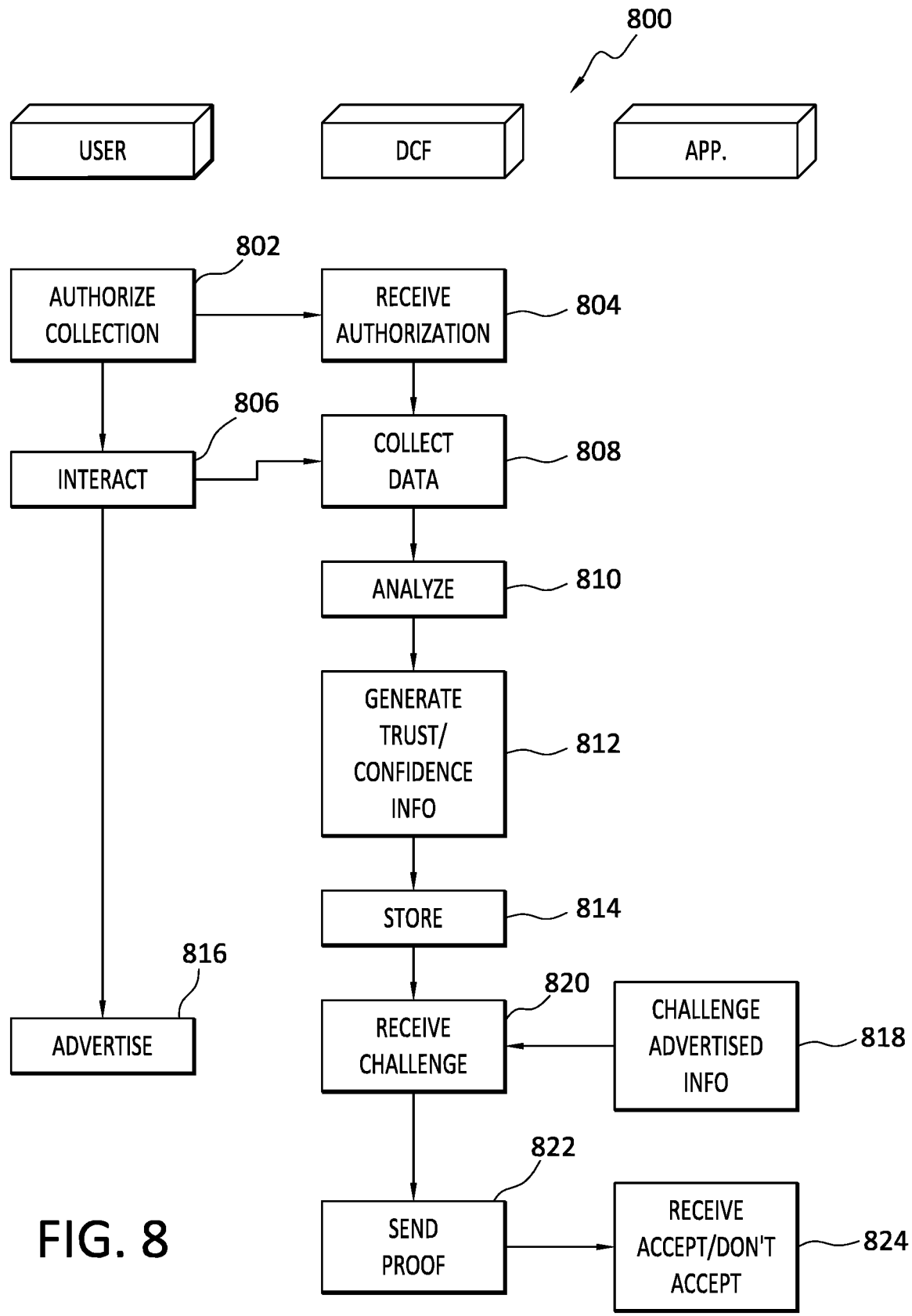
FIG. 8 discloses aspects of an example method for collecting and analyzing data.

With reference now to FIG. 8, details are provided concerning various methods, one example of which is denoted generally at 800. As indicated in FIG. 8, aspects of the example method 800 may be performed by a user, a DCF element or elements, and an application. However, the functional allocation, and order of processes, shown in FIG. 8 is provided only by way of example, and is not intended to limit the scope of the invention.

The method 800 may begin when a user authorizes 802 the collection of user data, by an element, such as a computing element for example, of a DCF, concerning one or more interactions of the user with that element. The authorization 802 may be based on, and/or take the form of, one or more user-defined policies that identify, for example, what data may be collected, when, and by which device(s).

The authorization to collect user data may be transmitted by the user and received 804 by the computing element or other element of the DCF. The DCF may be personal to this particular user, although that is not necessarily required. The authorization 802, and other processes disclosed herein or in FIG. 8, may relate to any group of one or more elements of the DCF.

At some point after receipt 804 of the user authorization 802, which authorization may be retracted by the user at any time, the user may begin interacting 806 with the computing element, and the computing element or other element of the DCF collects data 808 concerning interaction(s) of the user with that computing element. The collected data 808 may be stored and later analyzed 810, or may be analyzed in-flight 810 as the data stream is received from the user.

As a result of the analysis 810, the DCF may then generate 812 trust measurements and/or confidence scores concerning the data that was collected. As noted herein, the DCF may, before or after the analysis 810, generate and/or receive trust metadata associated with the collected data. Further, the DCF may apply trust insertion technologies to some or all of the collected data as that data flows to and/or through the DCF and/or other entities.

The trust and/or confidence information generated 812 by the DCF may then be stored 814. In some embodiments, the trust and/or confidence information may be stored wholly within the DCF when the DCF is personal to the user who generated the collected data. In this way, the user can be assured that the stored trust and/or confidence information will not be accessible by other entities without permission from the user.

At some point after the trust and/or confidence information is generated 812, the user whose data was collected 808 may choose to share such information. To this end, the user may advertise 816 some, or all, of his trust and/or confidence information. The advertised information may comprise, or consist of, one or more trust measurements and/or one or more confidence scores. To an application and/or other entity, the advertised 816 information may form the basis for establishment of a relationship of some type between the application, for example, and the user who is advertising 816.

In some instances, an application or other entity that may be interested in a relationship with the user may not be satisfied simply with the advertised 816 information. Thus, an application, for example, may issue a challenge 818 to the DCF concerning, for example, the user confidence score and the challenging application or other entity may ask for proof of one or more specified trust measurements. The DCF may receive 820 the challenge 818 and, in response to the challenge 818, transmit proof 822 to the application that issued the challenge. In some instances, the proof may not be transmitted 822 unless, or until, permission to do so is received by the DCF from the user.

Such proof may comprise, or consist of, any one or more of data generated by the user, trust measurements, trust metadata, and/or confidence scores. Upon receipt of the proof, the application or other entity may accept 824 the proof as adequate, and may further communicate with the user to establish a relationship. If the application is not satisfied with the proof, the application may not accept the proof as adequate, and the application and user may not establish a relationship at all. The foregoing considerations apply as well to another user. That is, a human user may issue a challenge to the DCF, and then receive proof of the advertised information. Where a human user, for example, makes an unjustified challenge to the confidence score or other information of another user, such as when the challenger may be trying to undermine the person with whom the confidence score is associated, the challenge, when shown to be unjustified, may be used to negatively impact the confidence score of the challenger.

E. Further Example Embodiments

Following are some further example embodiments of the invention. These are presented only by way of example and are not intended to limit the scope of the invention in any way.

Embodiment 1. A method, comprising: receiving authorization from a human user to collect data concerning an interaction of the human user with a computing element; interacting with the human user; collecting data concerning the interaction; analyzing the collected data; generating trust and confidence information, concerning the human user, based on analysis of the collected data; and storing the trust and confidence information.

Embodiment 2. The method as recited in embodiment 1, wherein the collected data comprises data concerning a behavioral characteristic of the human user, as that behavioral characteristic relates to the interaction.

Embodiment 3. The method as recited in any of embodiments 1-2, wherein the trust and confidence information includes any one or more of a trust measurement, and a confidence score.

Embodiment 4. The method as recited in any of embodiments 1-3, wherein analyzing the data, generating trust and confidence information, and storing the trust and confidence information, are performed in a user-specific data confidence fabric.

Embodiment 5. The method as recited in any of embodiments 1-4, wherein the authorization provided by the user is in the form of one or more user-specified policies.

Embodiment 6. The method as recited in any of embodiments 1-5, wherein interacting with the human user comprises receiving information from, and/or transmitting information to, the human user.

Embodiment 7. The method as recited in any of embodiments 1-6, wherein no data is collected without authorization from the user.

Embodiment 8. The method as recited in any of embodiments 1-7, wherein the operations further comprise responding to a challenge to the trust and confidence information.

Embodiment 9. The method as recited in any of embodiments 1-8, wherein the trust and confidence information includes a confidence score that is generated based on one or more trust measurements.

Embodiment 10. The method as recited in any of embodiments 1-9, wherein a data confidence fabric tracks and stores information concerning the identity of a computing element that collected the user information, the identity of a computing element that performed the analysis, and the identity of a computing element that generated the trust and confidence information.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Elements and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing elements and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

G. Example Host and Server Configurations

Figure 9:
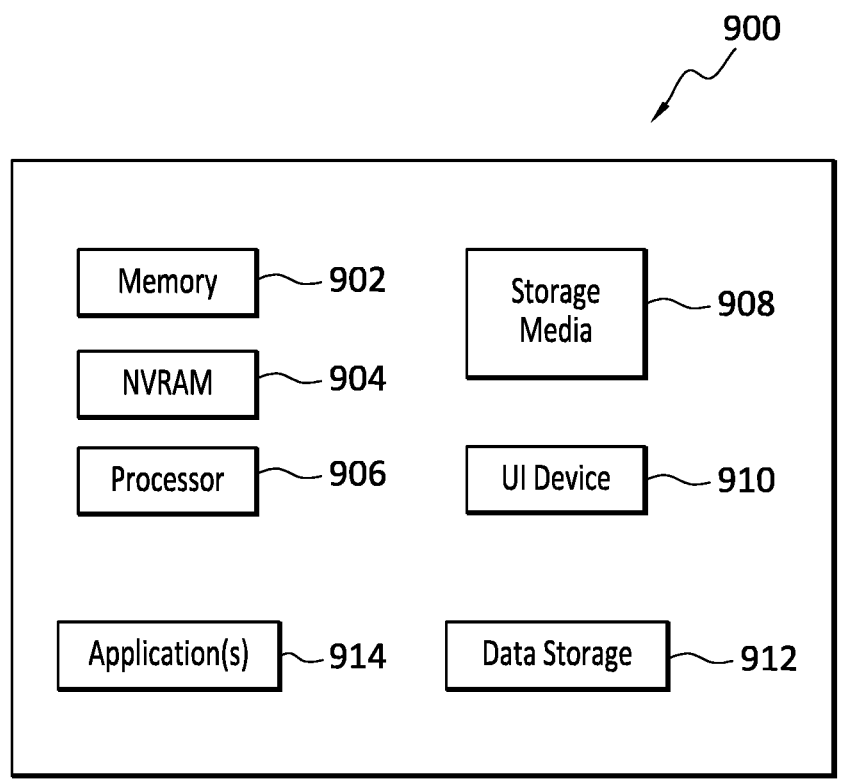
FIG. 9 discloses aspects of an example host device.

Finally, with reference briefly to FIG. 9, any one or more of the entities disclosed, or implied, by FIGS. 1-8 and/or elsewhere herein, may take the form of, or include, or be implemented on, or hosted by, a physical computing element, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing element 900 includes a memory 902 which may include one, some, or all, of random access memory (RAM), non-volatile random access memory (NVRAM) 904, read-only memory (ROM), and persistent memory, one or more hardware processors 906, non-transitory storage media 908, UI device 910, and data storage 912. One or more of the memory components 902 of the physical computing element 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving authorization from a human user, wherein the authorization includes a user-specific policy, which defines which data, that results from an interaction of the human user with a computing element, can be collected and who can collect the date for a user-defined period;
collecting the data based on the user-specific policy;
analyzing the collected data;
generating trust information and confidence information, concerning the data, based on the analyzing of the collected data, wherein the trust information and the confidence information indicate an extent to which the collected data is deemed to be trustworthy; and
storing the trust and confidence information.

2. The method as recited in claim 1, wherein the collected data comprises data concerning a behavioral characteristic of the human user, as that behavioral characteristic relates to the interaction.

3. The method as recited in claim 1, wherein the trust and confidence information includes any one or more of a trust measurement, and a confidence score.

4. The method as recited in claim 1, wherein analyzing the data, generating trust and confidence information, and storing the trust and confidence information, are performed in a user-specific data confidence fabric.

5. The method as recited in claim 1, wherein the interaction with the human user comprises, by the computing element, receiving information from, and/or transmitting information to, the human user.

6. The method as recited in claim 1, wherein no data is collected without authorization from the user.

7. The method as recited in claim 1, wherein the operations further comprise responding to a challenge to the trust and confidence information.

8. The method as recited in claim 1, further comprising assigning trust metadata to the data as the data flows through one or more nodes of a data confidence fabric, wherein one of the nodes is the computing element.

9. The method as recited in claim 1, wherein a data confidence fabric tracks and stores information concerning the identity of a computing element that collected the user information, the identity of a computing element that performed the analysis, and the identity of a computing element that generated the trust and confidence information.

10. A non-transitory storage medium having stored therein instructions that are executable by one or more hardware processors to perform operations comprising:
receiving authorization from a human user, wherein the authorization includes a user-specific policy, which defines which data, that results from an interaction of the human user with a computing element, can be collected and who can collect the date for a user-defined period;
collecting the data based on the user-specific policy;
analyzing the collected data;
generating trust information and confidence information, concerning the data, based on the analyzing of the collected data, wherein the trust information and the confidence information indicate an extent to which the collected data is deemed to be trustworthy; and
storing the trust and confidence information.

11. The non-transitory storage medium as recited in claim 10, wherein the collected data comprises data concerning a behavioral characteristic of the human user, as that behavioral characteristic relates to the interaction.

12. The non-transitory storage medium as recited in claim 10, wherein the trust and confidence information includes any one or more of a trust measurement, and a confidence score.

13. The non-transitory storage medium as recited in claim 10, wherein analyzing the data, generating trust and confidence information, and storing the trust and confidence information, are performed in a user-specific data confidence fabric.

14. The non-transitory storage medium as recited in claim 10, wherein the interaction with the human user comprises, by the computing element, receiving information from, and/or transmitting information to, the human user.

15. The non-transitory storage medium as recited in claim 10, wherein no data is collected without authorization from the user.

16. The non-transitory storage medium as recited in claim 10, wherein the operations further comprise responding to a challenge to the trust and confidence information.

17. The non-transitory storage medium as recited in claim 10, wherein the operations further comprise assigning trust metadata to the data as the data flows through one or more nodes of a data confidence fabric, wherein one of the nodes is the computing element.

18. The non-transitory storage medium as recited in claim 10, wherein a data confidence fabric tracks and stores information concerning the identity of a computing element that collected the user information, the identity of a computing element that performed the analysis, and the identity of a computing element that generated the trust and confidence information.

* * * * *